US008473972B2

(12) United States Patent
Terahara et al.

(10) Patent No.: US 8,473,972 B2
(45) Date of Patent: Jun. 25, 2013

(54) OPTICAL PICKUP AND DRIVE APPARATUS (75) Inventors: Noriaki Terahara, Osaka (JP); Shinsuke Hatanaka, Osaka (JP); Toshiyasu Tanaka, Osaka (JP); Takeshi Ohta, Osaka (JP); Fumitomo Yamasaki, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/418,672

(22) Filed: Mar. 13, 2012

(65) Prior Publication Data
US 2012/0240136 A1    Sep. 20, 2012

(30) Foreign Application Priority Data

Mar. 15, 2011  (JP) .................. 2011-056132

(51) Int. Cl.
*G11B 7/12*   (2006.01)
(52) U.S. Cl.
USPC ............................................ 720/671
(58) Field of Classification Search
USPC ............................................ 720/671
See application file for complete search history.

(56) References Cited

U.S. PATENT DOCUMENTS

| | | | | |
|---|---|---|---|---|
| 6,857,125 B2* | 2/2005 | Makino et al. | ............... | 720/671 |
| 7,228,553 B2* | 6/2007 | Lee et al. | ............... | 720/683 |
| 7,631,321 B2* | 12/2009 | Hayashi et al. | ............... | 720/671 |
| 7,640,559 B2* | 12/2009 | Wakabayashi et al. | ........ | 720/671 |
| 7,873,970 B2* | 1/2011 | Arai et al. | ............... | 720/671 |
| 7,882,513 B2* | 2/2011 | Aikoh et al. | ............... | 720/671 |
| 7,996,859 B2* | 8/2011 | Verhoeven et al. | ............ | 720/671 |
| 8,161,503 B2* | 4/2012 | Saito et al. | ............... | 720/671 |
| 2004/0111734 A1* | 6/2004 | Terashima | ............... | 720/671 |
| 2009/0073855 A1 | 3/2009 | Ishii | | |
| 2010/0067352 A1 | 3/2010 | Saito et al. | | |

FOREIGN PATENT DOCUMENTS

| | | |
|---|---|---|
| JP | 2003-217163 A | 7/2003 |
| JP | 2005-251246 A | 9/2005 |
| JP | 2010-073224 A | 4/2010 |

* cited by examiner

*Primary Examiner* — Mark Blouin
(74) *Attorney, Agent, or Firm* — Renner, Otto, Boisselle & Sklar, LLP (57) ABSTRACT An optical pickup includes a lens holder; an objective lens provided on the lens holder and having an effective region for collecting light from a light source and an edge located outer to the effective region; and a lens protector provided on the lens holder. The lens protector protrudes toward an optical disc more than the objective lens. The edge of the objective lens includes a convexed portion protruding toward the optical disc. An apex of the effective region of the objective lens protrudes toward the optical disc more than the convexed portion of the edge. A straight line connecting a part of the edge of the objective lens and a part of the lens protector is closer to the optical disc than the apex of the effective region of the objective lens.

7 Claims, 6 Drawing Sheets

OPTICAL PICKUP AND DRIVE APPARATUS

BACKGROUND OF THE INVENTION

1. Field of the Invention

The present invention relates to an optical pickup capable of reading information from an optical disc and a drive apparatus including such an optical pickup.

2. Description of the Related Art

Recently, short-wavelength laser light has been used in order to realize high recording density on optical discs. In accompaniment with this, the distance between the optical disc and an objective lens at the time of recording/reproduction has been decreased. Therefore, the possibility that the optical disc and the objective lens collide against each other and are damaged is raised. Damage of the objective lens deteriorates the optical characteristics of the optical pickup. Thus, it is necessary to prevent the optical disc and the objective lens from being damaged as a result of contacting each other while the optical pickup is driven.

Japanese Laid-Open Patent Publication No. 2010-73224 discloses an optical pickup including a plurality of lens protectors. In this optical pickup, when the optical disc and the objective lens approach each other abnormally closely, the optical disc and the plurality of lens protectors contact each other. Thus, the contact between the optical disc and the objective lens is prevented. In addition, among the plurality of lens protectors included in the optical pickup, a lens protector which is close to the objective lens is located at a higher position than the other lens protectors. With such a structure, even when the optical disc in an inclined state approaches the objective lens abnormally closely, the plurality of lens protectors contact the optical disc before the objective lens. Thus, the optical pickup is prevented from colliding against the objective lens.

Recently, optical pickups have been desired to be more and more compact. However, the above-described optical pickup, which includes a plurality of lens protectors in the vicinity of the objective lens, needs to have a large space for the lens protectors. Therefore, such an optical pickup has a problem of not being reduced in size easily.

As the number of times an optical pickup is used is increased, an objective lens thereof is soiled. Therefore, the objective lens needs to be cleaned with a cleaner disc dedicated for objective lenses.

The present invention, made in light of the above-described, problems, has an object of providing an optical pickup capable of preventing an optical disc and an effective region of an objective lens from colliding against each other and also capable of being reduced in size. The present invention has another object of providing an optical pickup capable of cleaning the objective lens efficiently while preventing the optical disc and the effective region of the objective lens from colliding against each other. The present invention has still another object of providing a drive apparatus including such an optical pickup.

SUMMARY OF THE INVENTION

An optical pickup according to the present invention includes a lens holder; an objective lens provided on the lens holder and having an effective region for collecting light from a light source and an edge located outer to the effective region; and a lens protector provided on the lens holder. The lens protector protrudes toward an optical disc more than the objective lens; the edge of the objective lens includes a convexed portion protruding toward the optical disc; an apex of the effective region of the objective lens protrudes toward the optical disc more than the convexed portion of the edge; and a straight line connecting a part of the edge of the objective lens and a part of the lens protector is closer to the optical disc than the apex of the effective region of the objective lens.

In an embodiment, the lens protector is located on one side of the objective lens.

In an embodiment, the lens protector is located upstream with respect to the objective lens in a rotation direction of the optical disc; and the lens protector includes a concaved portion which is recessed with respect to the optical disc more than the apex of the effective region of the objective lens, the concaved portion extending in a direction perpendicular to a track of the optical disc.

In an embodiment, a width of the concaved portion is equal to or greater than a width of the effective region in a direction perpendicular to the track of the optical disc.

In an embodiment, the lens protector has a shape gradually protruding toward the optical disc in a direction toward an inner circumferential part of the optical disc, and a direction toward an outer circumferential part of the optical disc, from the apex of the effective region of the objective lens.

In an embodiment, the lens protector is located downstream with respect to the objective lens in a rotation direction of the optical disc.

A drive apparatus according to the present invention includes the above-described optical pickup; a spindle motor for rotating the optical disc; and a control section for controlling an operation of the spindle motor and the optical pickup.

According to the present invention, the convexed portion of the edge of the objective lens is formed so as not to protrude toward the optical disc more than the apex of the effective region of the objective lens. Owing to this, the problem that the lens cleaner contacts the convexed portion of the edge and thus cannot clean the effective region does not occur. As a result, the objective lens can be efficiently cleaned. The straight line connecting a part of the edge of the objective lens and a part of the lens protector is closer to the optical disc than the apex of the effective region of the objective lens. Owing to this, the effective region of the objective lens is prevented from being damaged as a result of colliding against the optical disc. Since merely one lens protector is needed, the area in which the lens protector is located can be made smaller. Thus, while the effective region of the objective lens is prevented from being damaged, the optical pickup can be reduced in size.

According to an embodiment of the present invention, the lens protector has a concaved portion through which the brush of the cleaner disc can pass. Owing to this, contact between the objective lens and the brush is prevented from being obstructed by the lens protector.

According to an embodiment of the present invention, the width of the concaved portion of the lens protector is equal to or greater than the width of the effective region of the objective lens. Owing to this, contact between the objective lens and the brush is prevented more certainly from being obstructed by the lens protector.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, embodiments according to the present invention will be described with reference to the drawings.

(Embodiment 1)

Figure 1:
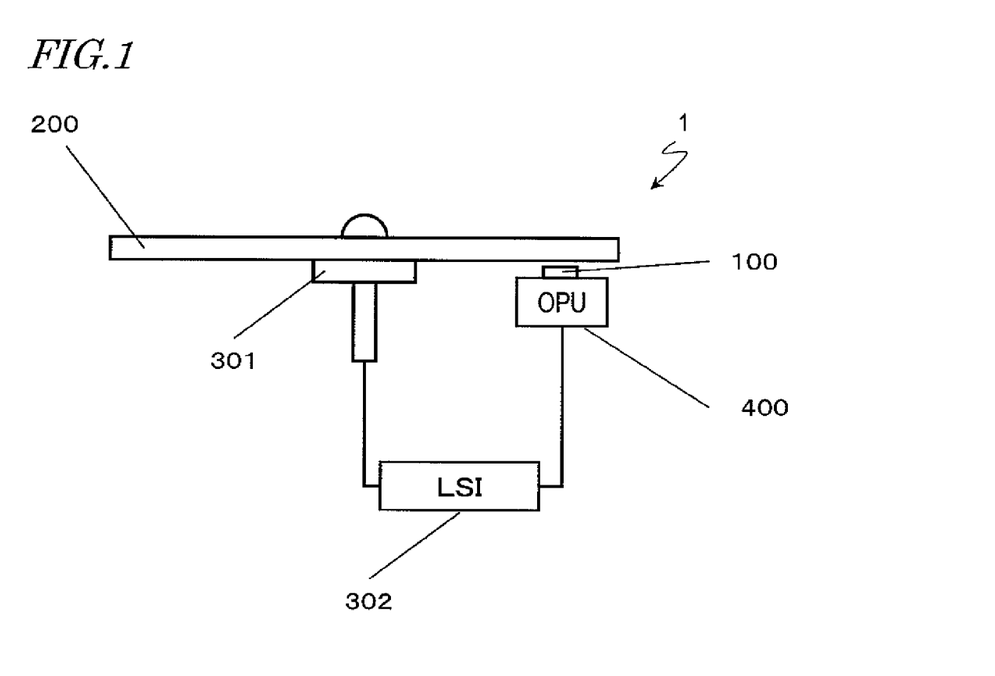
FIG. 1 shows a drive apparatus 1 in Embodiment 1 according to the present invention.

With reference to FIG. 1, a drive apparatus 1 in Embodiment 1 according to the present invention will be described. In this embodiment, an "optical disc" 200 means a usual known optical disc, and a "cleaner disc" 200 (FIG. 5) means a cleaner disc, for a lens, which includes a brush.

FIG. 1 shows the drive apparatus 1 in Embodiment 1. The drive apparatus 1 includes an optical pickup 400, an LSI 302, and a spindle motor 301. The spindle motor 301 rotates the optical disc 200 mounted on a turntable (not shown). The LSI 302 is a semiconductor device acting as a control section for controlling an operation of the optical pickup 400 and the spindle motor 301. For example, the LSI 302 can process a signal obtained from the optical pickup 400 and output the signal to an external device.

The optical pickup 400 is a device for reading information from the optical disc 200 or writing information on the optical disc 200. The optical pickup 400 includes an objective lens actuator 100 provided on an optical base. The optical base has optical elements including a laser diode, a photodetector, and a prism provided thereon.

Light emitted from the laser diode is collected on the optical disc 200 via the optical elements the objective lens actuator 100. Light reflected by the optical disc 200 is incident on the photodetector via the objective lens actuator 100 and the optical elements. The objective lens actuator 100 is supported by the optical base by a wire. The objective lens actuator 100 can be adjusted in terms of positions thereof in a focusing direction, a tracking direction and a tilting direction with respect to the optical disc 200 by a coil provided thereon and a magnet provided on the optical base. Owing to this, the optical pickup 400 can read information from, or write information on, the optical disc 200.

Figure 2A:
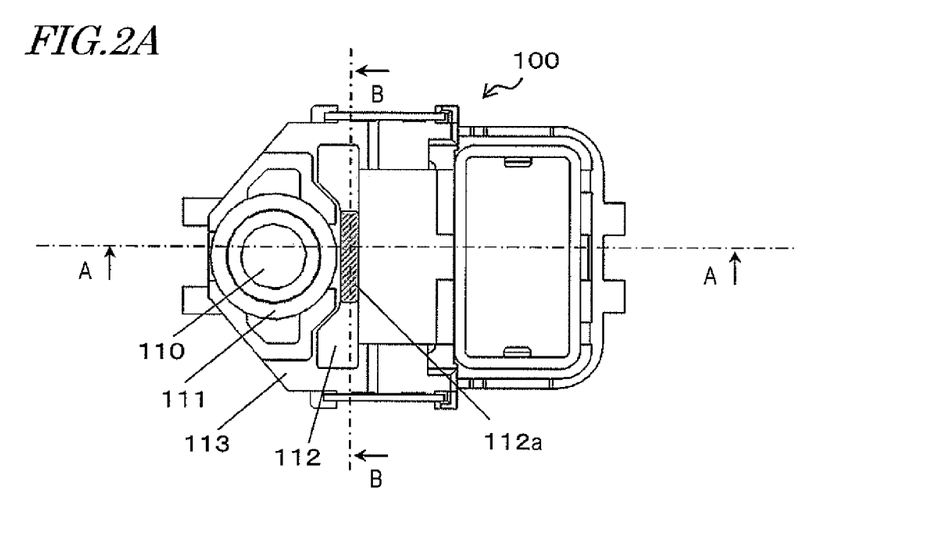
FIG. 2A is a plan view of an objective lens actuator in Embodiment 1 according to the present invention as viewed from the side of an optical disc.
Figure 2B:
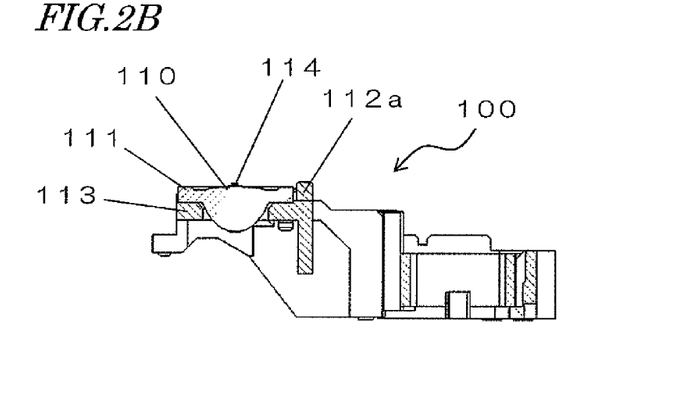
FIG. 2B is a cross-sectional view of the objective lens actuator in Embodiment 1 according to the present invention shown in FIG. 2A taken along line A-A in FIG. 2A.
Figure 2C:
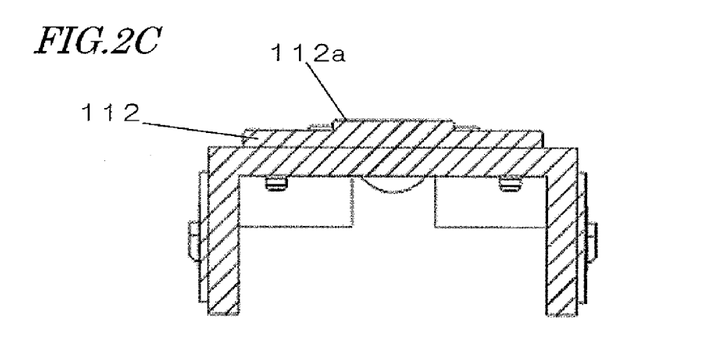
FIG. 2C is a cross-sectional view of the objective lens actuator in Embodiment 1 according to the present invention shown in FIG. 2A taken along line B-B in FIG. 2A.

Now, with reference to FIG. 2A through FIG. 2C, a structure of the objective lens actuator 100 will be described. FIG. 2A is a plan view of the objective lens actuator 100 as viewed from the side of the optical disc. FIG. 2B is a cross-sectional view of FIG. 2A taken along line A-A in FIG. 2A. FIG. 2C is a cross-sectional view of FIG. 2A taken along line B-B in FIG. 2A.

The objective lens actuator 100 includes a lens holder 113, and an objective lens 110 and a lens protector 112 are mounted on the lens holder 113.

The lens holder 113 is formed of a resin material. As can be seen from FIG. 2B, the lens holder 113 is structured to allow the objective lens 110 to be mounted thereon. In this embodiment, the objective lens 110 is provided in the vicinity of a side surface of the lens holder 113.

The objective lens 110 is a member for collecting light from the laser diode on the optical disc 200. The objective lens 110 is formed of a resin material having a hardness which is lower than a hardness of a surface of the optical disc 200 (polycarbonate). For example, the objective lens 110 is formed of an olefin-based resin. The objective lens 110 may be formed of glass. In the case where the objective lens 110 is formed of a resin, the effect of the present invention is more conspicuous because the resin is more liable to damage than glass.

Now, a shape of the objective lens 110 will be described. For forming the objective lens 110 by injection molding or the like, a gap is provided around an area, for an effective region of the objective lens, in the mold so that a lens material flows into the mold efficiently. Therefore, there is an area called an "edge" around the effective region of the objective lens produced by molding. Such an edge 111 is also used to bond and fix the objective lens 110 to the lens holder 113. A central portion of the objective lens 110 enclosed by the edge 111 is an effective region 115 (FIG. 3) on which the light from the light source is collected.

The edge 111 has a shape having a convexed portion protruding toward the optical disc 200. The convexed portion of the edge 111 is structured so as not to protrude toward the optical disc 200 more than an apex 114 of the effective region 115 of the objective lens 110, so that the edge 111 does not obstruct lens cleaning. The convexed portion of the edge 111 also acts to prevent the optical disc 200 from colliding against the effective region 115 of the objective lens 110. The details thereof will be described later.

The lens protector 112 is provided on the lens holder 113 in order to prevent the optical disc 200 and the effective region 115 of the objective lens 110 from colliding against each other. The lens protector 112 protrudes toward the optical disc 200 more than the objective lens 110.

Figure 5:
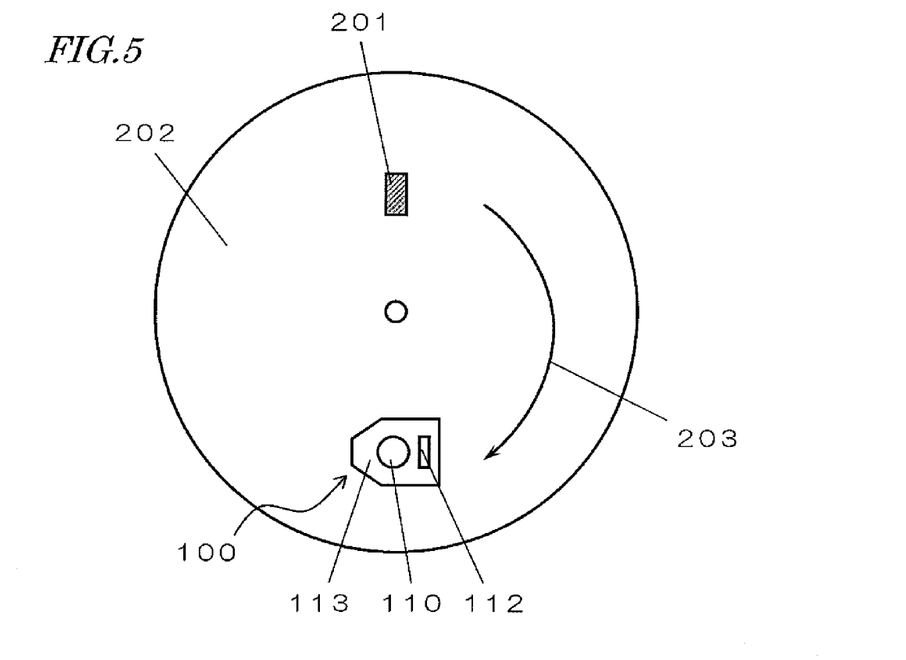
FIG. 5 shows the relationship between the objective lens actuator and a cleaner disc in Embodiment 1 according to the present invention.

The lens protector 112 is located on one side of the objective lens 110. Specifically, the lens protector 112 is located on the side of the objective lens 110 on which the lens protector 112 encounters a leading end of a pit in the optical disc 200. In this embodiment, the lens protector 112 is located only on the side on which the lens protector 112 encounters the leading end of a pit in the optical disc 200 (FIG. 5). Namely, the lens protector 112 is located only upstream with respect to the objective lens 110 in a rotation direction 203 (FIG. 5) of the optical disc 200. By providing only one lens protector 112, an area in which the lens protector 112 is located can be made smaller, which can reduce the size of the optical pickup 400.

The lens protector 112 is formed of a resin material having a hardness which is lower than the hardness of the surface of the optical disc 200 (polycarbonate). For example, the lens protector 112 is formed of polyacetal.

Figure 3:
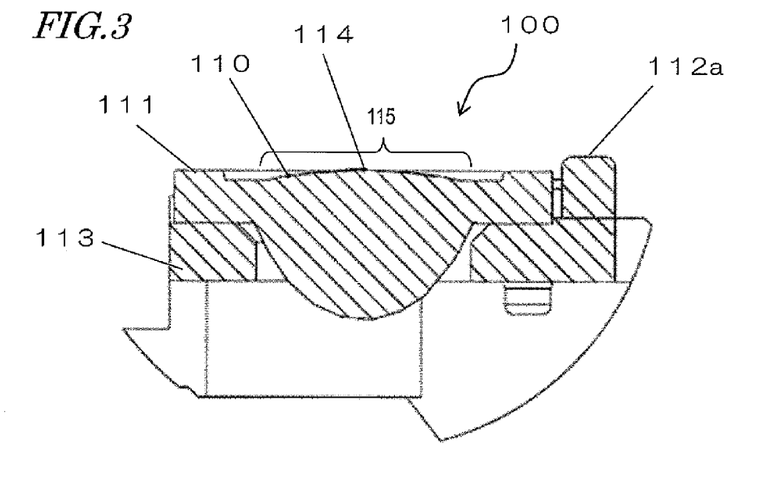
FIG. 3 is a partial enlarged view of the objective lens actuator in Embodiment 1 according to the present invention.
Figure 4:
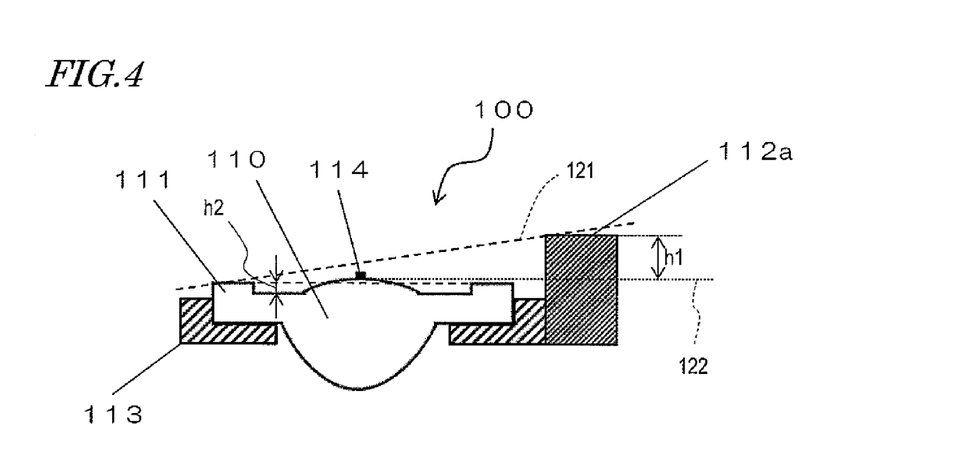
FIG. 4 illustrates the positional relationship between a lens protector and an objective lens in Embodiment 1 according to the present invention.
Figure 6:
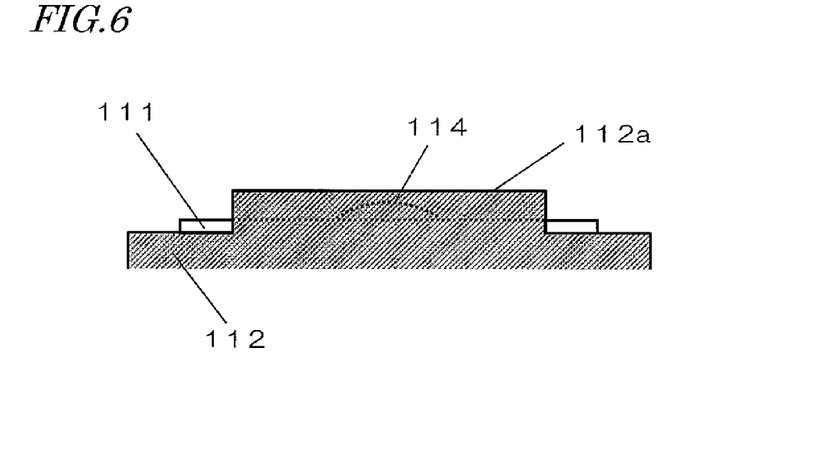
FIG. 6 illustrates the positional relationship between the lens protector and the objective lens in Embodiment 1 according to the present invention.

As shown in FIG. 2C, the lens protector 112 has a lens protector surface 112a on the side of the optical disc 200. As shown in FIG. 2B, FIG. 3, FIG. 4 and FIG. 6, the lens protector surface 112a protrudes toward the optical disc 200 more than the objective lens 110. FIG. 3 is a partial enlarged view of the objective lens actuator 100. FIG. 4 and FIG. 6 each illustrate the positional relationship between the lens protector and the objective lens in Embodiment 1 according to the present invention. A height difference h1 (FIG. 4) between the lens protector surface 112a and the apex 114 is, for example, 80 μm. A height h2 of the convexed portion of the edge 111 is, for example, 0.2 to 0.3 mm. As shown in FIG. 4, a straight line 121 connecting the lens protector surface 112a and an apex of the edge 111 is closer to the optical disc 200 than the apex 114 of the effective region 115 of the objective lens 110.

As described above, the convexed portion of the edge 111 is structured so as not to protrude toward the optical disc 200 more than the apex 114 of the effective region 115 of the objective lens 110. Therefore, at the time of a cleaning operation performed by a cleaner disc 202, the possibility that the edge 111 obstructs the cleaning operation on the objective lens 110 can be decreased.

The apex 114 of the effective region 115 of the objective lens 110 is not positioned closer to the optical disc 200 than the straight line connecting the lens protector surface 112a and the edge 111. Therefore, the possibility that the optical disc 200 collides against the effective region 115 of the objective lens 110 can be decreased.

The objective lens actuator 100 in this embodiment is adjusted in terms of the positions thereof in the focusing direction and the tracking direction with respect to the optical disc 200 by servo control when the optical pickup 400 reads information from, or writes information on, the optical disc 200. However, when being adjusted in terms of the positions, the objective lens actuator 100 may possibly collide against the optical disc 200 by vibrations of the drive apparatus 1 or the surface runout of the optical disc 200. In general, the lens holder 113 is formed of a material having a high rigidity in order to avoid resonance at the time of position adjustment of the objective lens actuator 100. Therefore, if the lens holder 113 collides against the optical disc 200 having a polycarbonate surface, the signal surface of the optical disc 200 is damaged. The objective lens 110 is formed of a material having a hardness lower than the hardness of polycarbonate. Therefore, when the apex 114 collides against the optical disc 200, the effective region 115 is damaged and thus the optical characteristics are deteriorated. Hence, in this embodiment, the optical disc 200 is prevented from being damaged as a result of colliding against the objective lens actuator 100, and also the optical characteristics are prevented from being deteriorated as a result of the effective region 115 being damaged.

As is clear from FIG. 4, the apex 114 and the lens holder 113 are located lower than the straight line connecting the edge 111 and the lens protector surface 112a with respect to the optical disc 200. Therefore, even when the objective lens actuator 100 collides against the optical disc 200, the possibility that the apex 114 and the lens holder 113 collide against the optical disc 200 is low. Thus, according to this embodiment, damaging to the optical disc 200 by the lens holder 113, and the deterioration of the optical characteristics by the collision of the apex 114 against the optical disc 200, can be prevented.

FIG. 5 shows the cleaner disc 202 which is being used to clean the surface of the objective lens actuator 100. On a signal surface of the cleaner disc 202, a brush 201 is provided. The drive apparatus 1 rotates the cleaner disc 202 and the brush 201 scans the surface of the objective lens actuator 100 along a tangential direction of the optical disc 200, and thus the surface of the objective lens actuator 100 can be cleaned. In this process, the edge 111 (FIG. 4), which is structured so as not to protrude toward the optical disc 200 more than the apex 114 of the effective region 115 of the objective lens 110, does not obstruct the cleaning.

The lens protector 112 may be located downstream with respect to the objective lens 110 in the rotation direction 203 of the optical disc 200. Owing to this structure, the lens protector 112 can be prevented from obstructing lens cleaning.

(Embodiment 2)

Now, a lens protector 112 in Embodiment 2 according to the present invention will be described. According to a structure of the lens protector 112 in this embodiment, even when the lens protector 112 needs to be located upstream with respect to the objective lens 110 due to a restriction by product design or any other reason, the lens protector 112 can be prevented from obstructing lens cleaning.

Figure 7A:
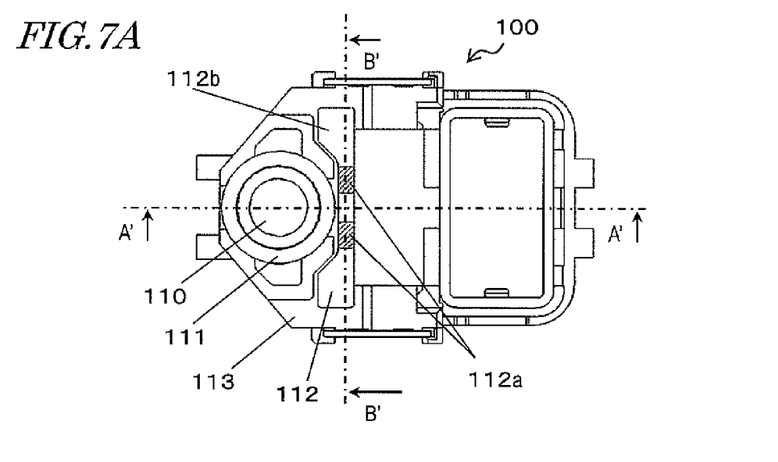
FIG. 7A is a plan view of an objective lens actuator in Embodiment 2 according to the present invention as viewed from the side of the optical disc.
Figure 7B:
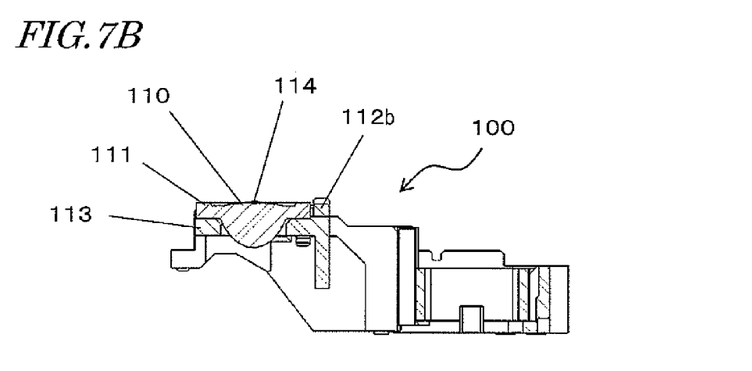
FIG. 7B is a cross-sectional view of the objective lens actuator in Embodiment 2 according to the present invention shown in FIG. 7A taken along line A'-A' in FIG. 7A.
Figure 7C:
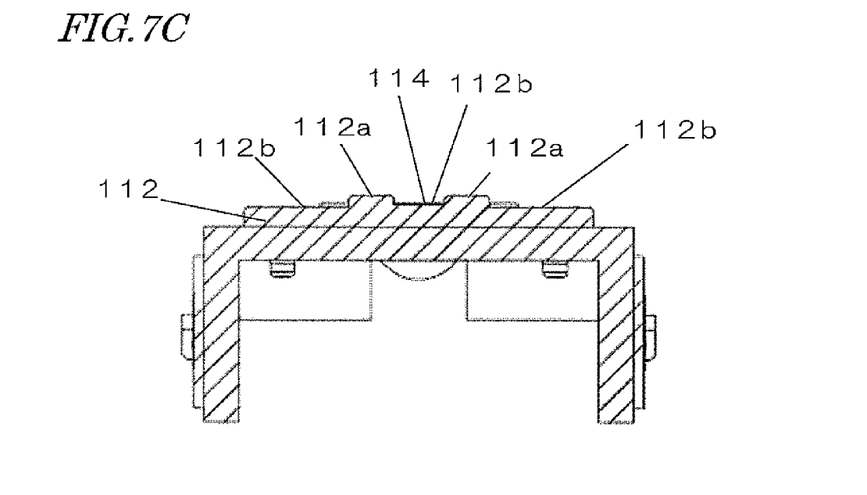
FIG. 7C is a cross-sectional view of the objective lens actuator in Embodiment 2 according to the present invention shown in FIG. 7A taken along line B'-B' in FIG. 7A.
Figure 8:
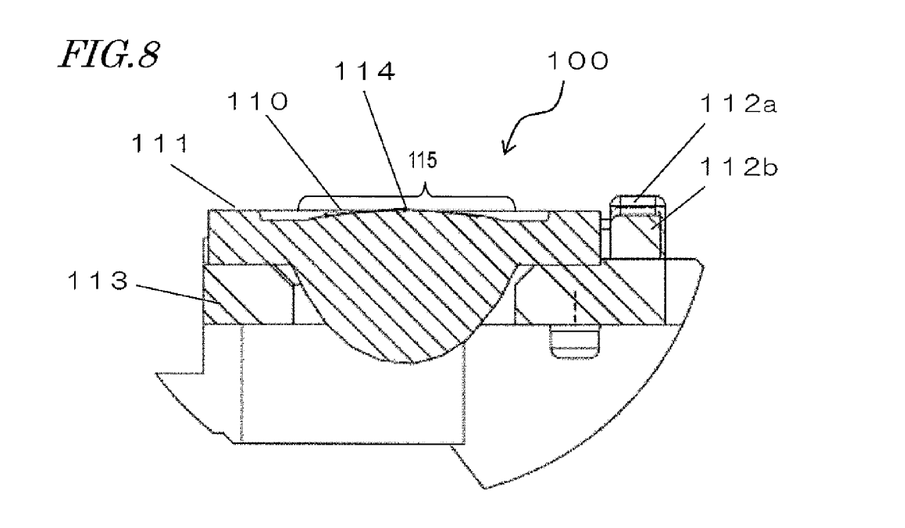
FIG. 8 is a partial enlarged view of the objective lens actuator in Embodiment 2 according to the present invention.
Figure 9:
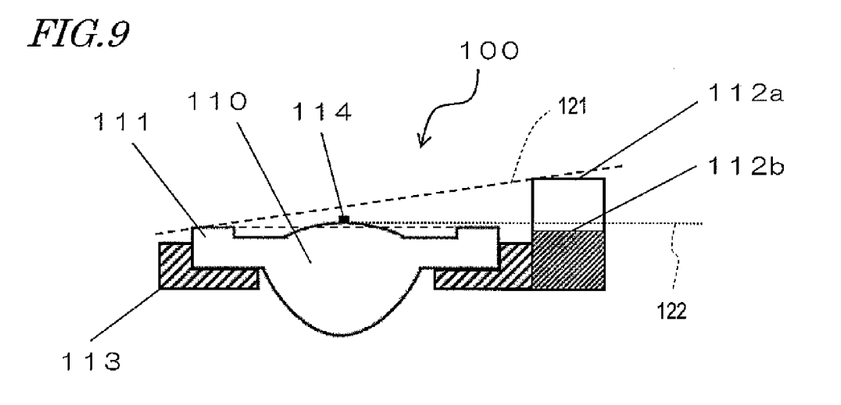
FIG. 9 illustrates the positional relationship between a lens protector and the objective lens in Embodiment 2 according to the present invention.
Figure 10:
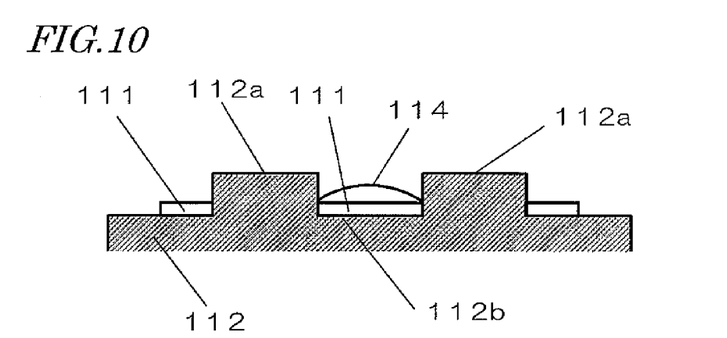
FIG. 10 illustrates the positional relationship between the lens protector and the objective lens in Embodiment 2 according to the present invention.

FIG. 7A is a plan view of the objective lens actuator 100 in Embodiment 2 as viewed from the side of the optical disc. FIG. 7B is a cross-sectional view of FIG. 7A taken along line A'-A' in FIG. 7A. FIG. 7C is a cross-sectional view of FIG. 7A taken along line B'-B' in FIG. 7A. FIG. 8 is a partial enlarged view of the objective lens actuator 100 in Embodiment 2. FIG. 9 and FIG. 10 each illustrate the positional relationship between the lens protector and the objective lens in Embodiment 2.

The lens protector 112 in Embodiment 2 further includes a lens protector surface 112b located lower (farther from the optical disc 200) than the lens protector surfaces 112a. The lens protector surfaces 112a are located closer to the optical disc 200 than the lens protector surface 112b. A part of the lens protector surface 112b which is sandwiched by the lens protector surfaces 112a defines a concaved portion. The rest of the structure in Embodiment 2 is substantially the same as that in Embodiment 1, and substantially the same descriptions will not be repeated.

As shown in FIG. 7B, FIG. 8, FIG. 9 and FIG. 10, the lens protector surface 112b (concaved portion) extends in a direction which is parallel to the signal surface of the optical disc 200 and is perpendicular to a track of the optical disc 200, and is recessed with respect to the optical disc 200 more than the apex 114 of the effective region 115 of the objective lens 110. The tracking direction of the optical disc 200 corresponds to the rotation direction 203 (FIG. 5). Since the brush 201 (FIG. 5) of the cleaner disc 202 passes the concaved portion, the lens protector 112 can be prevented from obstructing lens cleaning.

It is preferable that a width of the part of the lens protector surface 112b which is sandwiched by the lens protector surfaces 112a (width of the concaved portion) is equal to or greater than the diameter of the effective region 115. With such a setting, the possibility that the lens protector 112 obstructs the brush 201 is further decreased.

As shown in FIG. 9, also in the case where the lens protector 112 has the lens protector surface 112b, the apex 114 of the effective region 115 of the objective lens 110 and the lens holder 113 are located lower than the straight line 121 connecting the edge 111 and the lens protector surface 112a with respect to the optical disc 200. Therefore, even when the objective lens actuator 100 collides against the optical disc 200, the apex 114 and the lens holder 113 can be prevented from colliding against the optical disc 200.

Figure 11:
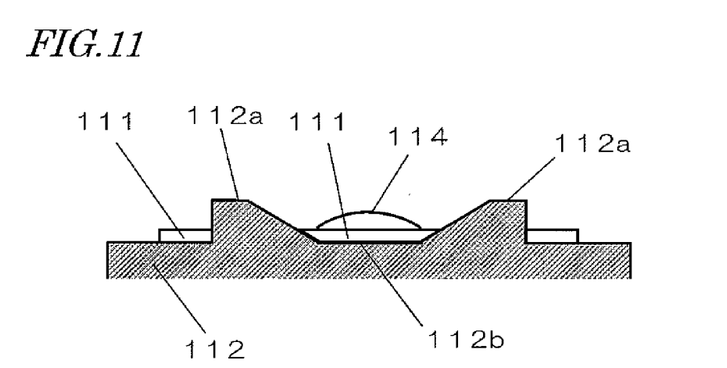
FIG. 11 shows another example of the lens protector in Embodiment 2 according to the present invention.

In the example shown in FIG. 10, parts of the lens protector 112 having the lens protector surfaces 112a extend vertically from the lens protector surface 112b. Alternatively, as shown in FIG. 11, parts of the lens protector 112 having the lens protector surfaces 112a may protrude gradually. In the example shown in FIG. 11, the lens protector 112 gradually protrudes toward the optical disc 200 in a direction toward an inner circumferential part of the optical disc 200 from the apex 114 and a direction toward an outer circumferential part of the optical disc 200 from the apex 114. Even with such a shape of the lens protector 112, the apex 114 and the lens holder 113 can be prevented from colliding against the optical disc 200 without the lens cleaning being obstructed.

The present invention is especially useful for an optical pickup or the like usable for an optical disc player, an optical disc recorder or the like.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2011-056132 filed on Mar. 15, 2011 and No. 2012-048058 filed on Mar. 5, 2012, the entire contents of which are hereby incorporated by reference.

What is claimed is:

1. An optical pickup, comprising:
   a lens holder;
   an objective lens provided on the lens holder and having an effective region for collecting light from a light source and an edge located outer to the effective region; and
   a lens protector provided on the lens holder;
   wherein:
   the lens protector protrudes toward an optical disc more than the objective lens;
   the edge of the objective lens includes a convexed portion protruding toward the optical disc;
   an apex of the effective region of the objective lens protrudes toward the optical disc more than the convexed portion of the edge; and
   a straight line connecting a part of the edge of the objective lens and a part of the lens protector is closer to the optical disc than the apex of the effective region of the objective lens.

2. The optical pickup of claim 1, wherein the lens protector is located on one side of the objective lens.

3. The optical pickup of claim 1, wherein:
   the lens protector is located upstream with respect to the objective lens in a rotation direction of the optical disc; and
   the lens protector includes a concaved portion which is recessed with respect to the optical disc more than the apex of the effective region of the objective lens, the concaved portion extending in a direction perpendicular to a track of the optical disc.

4. The optical pickup of claim 3, wherein a width of the concaved portion is equal to or greater than a width of the effective region in a direction perpendicular to the track of the optical disc.

5. The optical pickup of claim 3, wherein the lens protector has a shape gradually protruding toward the optical disc in a direction toward an inner circumferential part of the optical disc, and a direction toward an outer circumferential part of the optical disc, from the apex of the effective region of the objective lens.

6. The optical pickup of claim 1, wherein the lens protector is located downstream with respect to the objective lens in a rotation direction of the optical disc.

7. A drive apparatus, comprising:
   the optical pickup of claim 1;
   a spindle motor for rotating the optical disc; and
   a control section for controlling an operation of the spindle motor and the optical pickup.

* * * * *